United States Patent
Aarts

(10) Patent No.: US 11,091,282 B2
(45) Date of Patent: Aug. 17, 2021

(54) APPARATUS AND METHOD FOR SEALING OR TYING PRODUCTS

(71) Applicant: DuoSeal Automatics B.V., Tilburg (NL)

(72) Inventor: Guido Maurinus Adriana Maria Aarts, Drunen (NL)

(73) Assignee: DuoSeal Automatics B.V., Tilburg (NL)

( * ) Notice: Subject to any disclaimer, the term of this patent is extended or adjusted under 35 U.S.C. 154(b) by 327 days.

(21) Appl. No.: 15/975,392

(22) Filed: May 9, 2018

(65) Prior Publication Data

US 2018/0327123 A1    Nov. 15, 2018

(51) Int. Cl.
| | |
|---|---|
| *B65B 13/00* | (2006.01) |
| *B65B 51/00* | (2006.01) |
| *B65B 25/00* | (2006.01) |
| *B65B 61/00* | (2006.01) |
| *B65B 27/00* | (2006.01) |
| *B65B 67/00* | (2006.01) |
| *B32B 38/00* | (2006.01) |
| *B65B 13/16* | (2006.01) |
| *B65B 13/34* | (2006.01) |
| *B65B 51/06* | (2006.01) |
| *B65B 25/02* | (2006.01) |

(Continued)

(52) U.S. Cl.
CPC .............. *B65B 13/16* (2013.01); *B65B 13/34* (2013.01); *B65B 25/023* (2013.01); *B65B 27/105* (2013.01); *B65B 51/065* (2013.01); *B65B 61/20* (2013.01); *B29C 66/95* (2013.01); *B32B 38/0004* (2013.01); *B65B 67/06* (2013.01); *Y10T 156/1339* (2015.01); *Y10T 156/1343* (2015.01)

(58) Field of Classification Search
None
See application file for complete search history.

(56) References Cited

U.S. PATENT DOCUMENTS

| 2,841,935 A | 7/1958 | Krueger |
| 4,545,185 A | 10/1985 | Chikatani |
| (Continued) | | |

FOREIGN PATENT DOCUMENTS

| EP | 2 635 495 | 9/2013 |
| GB | 807 665 | 1/1959 |
| (Continued) | | |

OTHER PUBLICATIONS

Machine English Translation of NL 198902097 A; Mar. 18, 1991 ;13 pages. (Year: 1991).*

(Continued)

*Primary Examiner* — Linda L Gray
(74) *Attorney, Agent, or Firm* — Adsero IP

(57) ABSTRACT

An apparatus for sealing or tying products, comprising a housing with at least a first tape dispenser and a star wheel, a slot defined by or through the housing, wherein the star wheel extends at least partly in said slot, wherein the star wheel comprises a series of first cells and a series of second cells, the first and second cells being intermittently disposed in the star wheel, each cell being open to a periphery of the star wheel and two opposite sides thereof, wherein an urging device is provided having at least one edge portion for urging at least one product to be tied into one of the cells, especially a first cell.

13 Claims, 12 Drawing Sheets

(51) Int. Cl.
*B65B 61/20* (2006.01)
*B65B 27/10* (2006.01)
B65B 67/06 (2006.01)
B29C 65/00 (2006.01)

(56) References Cited

U.S. PATENT DOCUMENTS

| | | | |
|---|---|---|---|
| 9,339,998 B2* | 5/2016 | Aarts | B32B 37/12 |
| 9,469,425 B2* | 10/2016 | Aarts | B65B 67/06 |
| 2013/0277240 A1* | 10/2013 | Aarts | B65B 61/20 |
| | | | 206/83.5 |
| 2013/0292271 A1* | 11/2013 | Aarts | B65B 27/105 |
| | | | 206/83.5 |

FOREIGN PATENT DOCUMENTS

| | | |
|---|---|---|
| GB | 1 584 192 | 2/1981 |
| NL | 6 804 235 | 9/1969 |
| NL | 8 902 097 | 3/1991 |
| WO | WO 2012/060702 | 5/2012 |
| WO | WO 2015/174845 | 11/2015 |

OTHER PUBLICATIONS

Human English Translation of NL 6804235A; Sep. 1969; 15 pages. (Year: 1969).*

NL Search Report from NL App No. 2018897 dated Dec. 11, 2017 in Dutch and English.

* cited by examiner

APPARATUS AND METHOD FOR SEALING OR TYING PRODUCTS

RELATED APPLICATIONS

This application claims priority to Netherlands Application No. 2018897, filed May 11, 2017, entitled "Apparatus and Method for Sealing or Tying Products" which is incorporated herein by reference in its entirety.

TECHNICAL FIELD

The invention relates to an apparatus and method for sealing or tying products. The invention more specifically relates to an apparatus and method for wrapping at least an adhesive strip of tape around at least part of a bundle of products for tying them together.

BACKGROUND

It is known to gather a bundle of products such as produce, for example flowers, and wrap an elastic band around part of said products, such as around the stems of the flowers, in order to bundle them. It is also known to gather such products into a bundle and then wrap an adhesive tape around part of them, such as around the stem of a bundle of flowers, for bundling them. Such apparatus are for example known from U.S. Pat. No. 2,841,935, NL8902097 and U.S. Pat. No. 4,545,185.

In U.S. Pat. No. 2,841,935 a sealer is shown having a wheel comprising a series of slots defined in the periphery thereof, regularly spaced relative to each other along said periphery. Between each set of two adjacent slots a knife is housed in the wheel, having a cutting edge extending slightly from said periphery. Tape fed over the periphery can be cut by such cutting edge when the wheel is turned during feed through of a bag to be closed and sealed.

In NL8902097 a sealer is shown having a star wheel having six identical slots provided evenly distributed around the periphery of the star wheel. Products can be hand fed through a slot in the housing of this sealer for rotating the wheel and sealing the bag.

EP2635495 discloses an apparatus for binding, especially taping products or bundles of products, comprising a star wheel with a series of first cells and a series of second cells, first and second cells being intermittently provided around the periphery of the star wheel. A knife carrier is provided alongside the periphery of the star wheel, allowing a knife to be moved into and out of a second cell for cutting the tape.

In U.S. Pat. No. 4,545,185 a sealer with a star wheel is disclosed, wherein the star wheel has four first slots into which the neck of a bag to be sealed can be fed, and in the middle between two adjacent first slots a second slot is provided for allowing a knife to cut tape fed over the periphery of the wheel.

An aim of the present invention is to provide an alternative to these known apparatus and methods. Another aim of the present invention is to provide a method and apparatus for sealing or tying products into bundles. A still further aim is to provide a method and apparatus for tying fresh produce, flowers or the like natural products. An aim of the present disclosure is to ensure proper cutting of tape extending along part of the periphery of the star wheel.

One or more of these and/or other aims can be obtained with an apparatus and/or method according to invention.

SUMMARY OF THE EMBODIMENTS

An apparatus for sealing or tying products can comprise a housing with at least a first tape dispenser and a star wheel. A slot can be defined by or through the housing, wherein the star wheel extends at least partly in said slot. The star wheel comprises at least a series of first cells, the first cells being intermittently disposed in the star wheel, each first cell being open to a periphery of the star wheel and two opposite sides thereof. At least one of the star wheel and the housing is provided with at least one knife and the other of the star wheel and the housing is preferably provided with an anvil. The at least one knife is movable or the at least one knife and the at least one anvil are movable relative to each other. To this end either the knife or the anvil can be movable, or both. An urging device may be provided having at least one edge portion for urging at least one product to be tied into one of the cells, especially a first cell. The knife may contact the anvil in order to cut the tape or tapes, or the anvil can be used for holding the tape or tapes against or in the proximity of the periphery of the star wheel during cutting, for example adjacent a cutting edge of the knife.

Instead of or in addition to one or more anvils the tape tension can be altered, especially increased, during cutting, in order to pull the tape or tapes more taut over the periphery of the star wheel during cutting.

In embodiments multiple knifes may be provided in the star wheel, preferably one for each of the first cells. The knifes may be provided in the star wheel, movable in a substantially radial direction of the star wheel, preferably between a position in which a cutting edge of the knife is held within the periphery of the star wheel and a position in which the cutting edge has passed the said periphery.

In a method according to the disclosure for sealing or tying products, adhesive tape is led over an open side of a cell of a star wheel, an adhesive side of the tape facing away from the star wheel, wherein a product or a bundle of products is pushed against the tape and into the cell, adhering at least part of the adhesive tape around at least part of the product or bundle of products, and rotating the star wheel around an axis, tying the tape round the product or the bundle of products. Then the star wheel is rotated further and the tape cut, allowing the bundle to be removed from the cell. The tape is cut by moving a cutting edge of a knife through the tape against an anvil, preferably by moving a knife at least partly out of the star wheel.

BRIEF DESCRIPTION OF THE DRAWINGS

By way of example apparatus, methods, use and products shall be described hereafter, schematically and in relative detail, with reference to the drawing, in which.

DETAILED DESCRIPTION

In this description the same or similar or corresponding parts can have the same or corresponding reference signs. The embodiments shown and described are exemplary embodiments only and should by no means be understood as limiting the scope of protection sought as defined by the claims. The apparatus and methods according to the invention are described in relation to fresh products such as flowers, produce and the like, uncovered or covered. This should not be considered limiting. A similar apparatus could be used for example sealing or tying bags, wrappings, bundles of other products, such as but not limited to rods, sticks and other such elements.

In this description a container can be described to be tied by the tape with the product or products. Such container can for example be, but is not limited to, a sachet, bag, flask, box, bottle or any container suitable for holding content. Alternatively other items could be tied to a product or bundle of products in the same or similar manner. Such items are, for the purpose of this description, also to be understood as encompassed by the description.

In this description apparatus will be described which may be hand-operated, that is wherein products to be tied or sealed are fed through the apparatus manually, and apparatus which may be mechanically driven, for example motor driven. Mechanical means can be provided to feed the products through the apparatus, or at least assist a user in feeding the products through the apparatus, such as transport bands, chains and other transport means. Star wheel should be understood as at least including any element, rotational around a real or virtual axis, provided with cells along the periphery forming positions for receiving products or parts thereof to be tied or sealed and/or receiving at least part of a knife or other cutting or slicing tool or element.

Relevant following first cell can be understood as meaning a first cell following the said first cell seen in a direction of rotation of the star wheel, which can be used for tying or sealing products.

In this disclosure knives and anvils will be described which are movable, relative to a star wheel. Especially regarding a knife movable should be understood as movable relative to tape extending along a relevant part of the star wheel, in order to cut the tape or tapes. Such movement may be in any direction and can especially include a substantial radial direction or a substantially axial direction. A substantial radial direction should be understood at least as a direction extending from an axis of the star wheel outward, substantially perpendicular to a tangent to the periphery of the star wheel. Such substantially radial direction may extend as a normal to the axis of the star wheel. A substantial axial direction should be understood at least as a direction extending substantially parallel to an axis of rotation of the star wheel. A knife can also move in a combined axial and radial direction.

Figure 1:
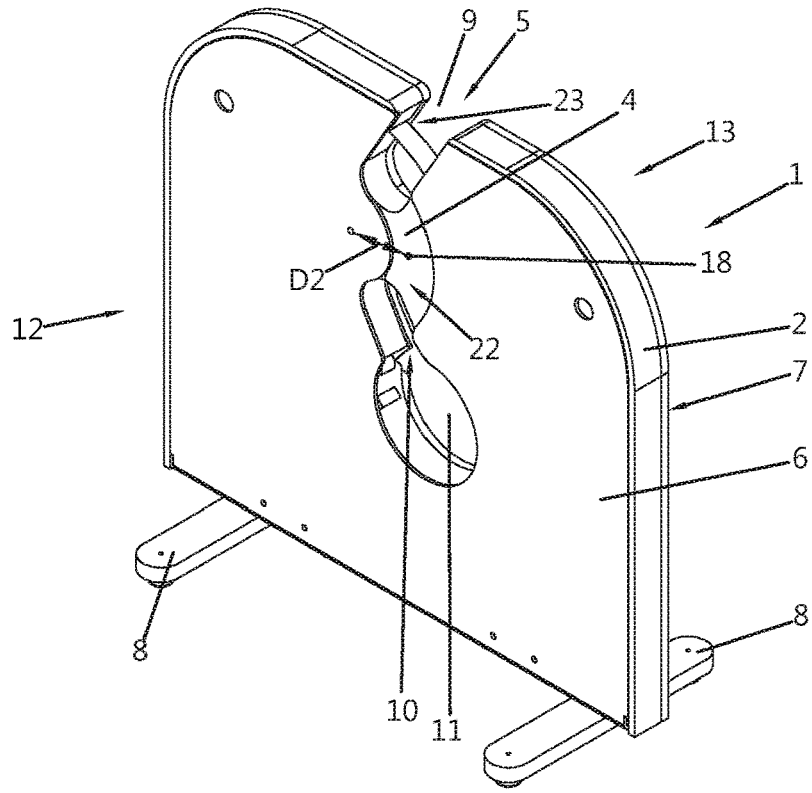
FIG. 1 shows schematically in perspective view an apparatus of the present description, in a first embodiment.
Figure 2:
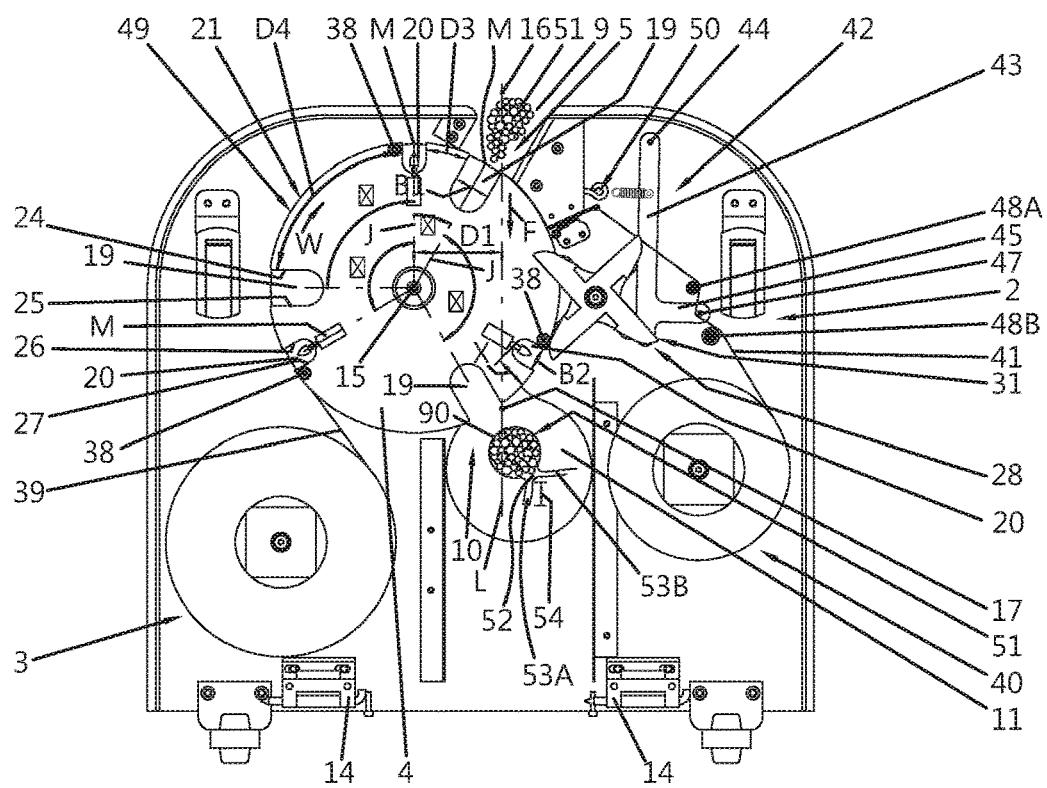
FIG. 2 shows schematically in frontal view, opened, an apparatus of FIG. 1.
Figure 3:
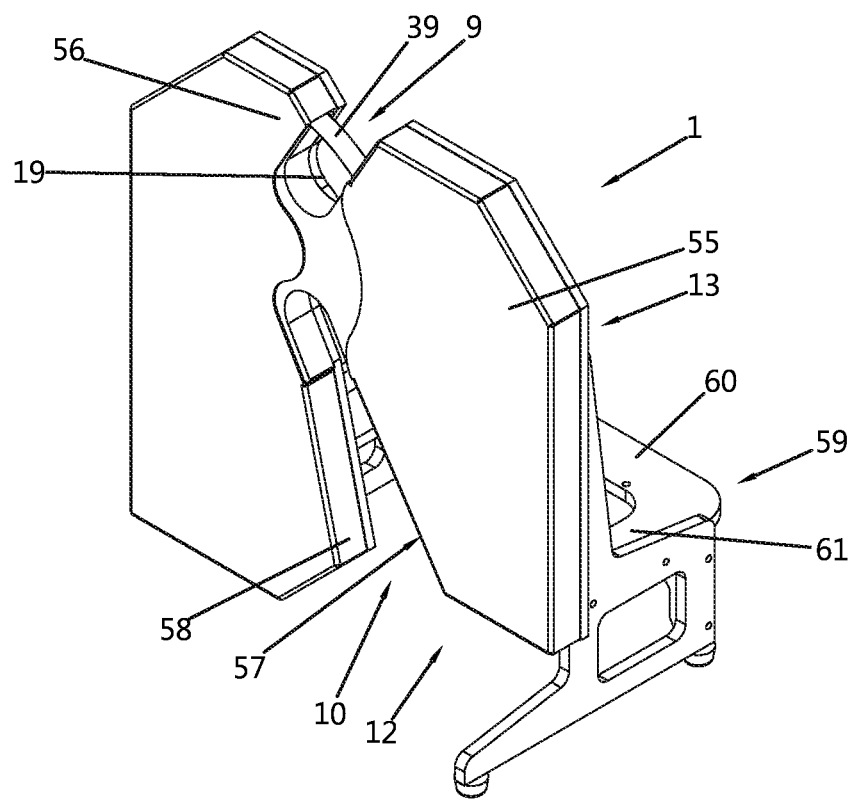
FIG. 3 shows schematically in perspective view an apparatus of the present description, in a second embodiment.

FIGS. 1 and 2 show a first exemplary embodiment of an apparatus. The apparatus 1 comprises a housing 2, at least a first tape dispenser 3 and a star wheel 4. A slot 5 is defined by or through the housing 2. The star wheel 4 extends at least partly in said slot 5. In this embodiment the housing 2 comprises a front panel 6 and back panel 7 and rests on legs 8 for providing stability and the possibility of moving the apparatus 1 to an appropriate position. The apparatus can thus be mobile. However, it is also possible to install the apparatus permanently or semi permanently in one location, for example at a packaging line. In this embodiment the slot 5 extends from an inlet opening 9 to an outlet opening 10. The outlet opening 10 can be provided between the inlet opening 9 and the legs 8. In the embodiment of FIGS. 1 and 2 the outlet opening 10 opens into a hole 11 extending through the housing 2, opening to both the front 12 and back 13 thereof. The slot 5 is formed by cut outs in the front panel 6 and back panel 7.

In FIG. 2 the front panel 6 has been removed, for example pivoted down around pivots 14, opening the housing 2. As can be seen the star wheel 4 can be mounted on an axis 15, extending substantially perpendicular to the front and back 12, 13 of the housing 2, such that it can be rotated around said axis 15 within the housing 2. In an embodiment the inlet opening 9 and outlet opening 10 can be positioned such that a straight line L drawn between a mid 16 of the inlet opening 9 and a mid 17 of the outlet opening 10 extends past the axis 15 at a distance D1 there from. The slot 5 is curved between the inlet opening 9 and outlet opening 10 such that it passes the axis 15, a mid 18 thereof being at a distance D2 from the axis 15. The distance D2 can in an embodiment be larger than the distance D1. In other embodiments it can be smaller or the same.

The star wheel 4 comprises a series of first cells 19 and a series of second cells 20. The position of each cell 19, 20 is for the sake of this description defined by a line J extending through the axis 15 and a mid M of a relevant cell 19, 20 at the periphery 21. The first cells 19 and second cells 20 can be intermittently disposed in the star wheel 4. This has to be understood as including but not necessarily limited to an arrangement of the cells 19, 20 around the periphery 21 of the star wheel 4 such that between two adjacent first cells 19 seen around the periphery 21 a second cell 20 is provided. Each first cell 19 is open to the periphery 21 of the star wheel 4 and two opposite sides 22, 23 thereof. In the embodiments shown there is the same number of first cells 19 as there are second cells 20. In an embodiment there can be three first cells 19 and three second cells 20. In an embodiment the first cells 19 can be distributed around the periphery 21 evenly, as can the second cells 20. For three first cells 19 this means that an angle α included between two lines J through adjacent first cells 19 will be approximately 120 degrees. Similarly for three second cells 20 the angle β included between two lines J through adjacent second cells 20 will be approximately 120 degrees. For different numbers of first and second cells 19, 20 the angles α, β will be amended accordingly, by the definition 360 degrees divided by the number of first or second cells 19, 20 respectively.

In the present disclosure the first cells 19 are designed for receiving products or bundles of products to be bound or sealed, wherein the second cells 20 are provided with one of a knife 31 and an anvil 31B, as will be described. The second cells can be open to the opposite sides of the star wheel, or to one side, or can be fully enclosed between the sides of the star wheel 4. Second cell 20 should be understood as including but not limited to any provision in or on the star wheel 4, adjacent to and/or in a periphery 21 thereof, in which a knife 31 or an anvil 31B can be provided, preferably in a movable way, as will be discussed.

In an embodiment each first cell 19 comprises a leading edge 24 and a trailing edge 25, whereas each of the second cells 20 has a leading edge 26 and a trailing edge 27, seen in a direction of rotation W of the star wheel 4. A direction of rotation W of the star wheel 4 is defined by rotation of the star wheel 4 around the axis 15 such that a cell 19, 20 moves from near the inlet opening 9 to near the outlet opening 20 over the shortest path of travel, along the slot 5. In an embodiment a distance D3 between a trailing edge 25 of a first cell 19 and a leading edge 26 of an adjacent second cell 20, measured along the periphery 21 of the star wheel 4 is smaller than the distance D4 between the trailing edge 27 of said second cell 20 and a leading edge 26 of the same second cell 20 and a following relevant first cell 19. In an embodiment the distance D3 can be less than half the distance between two adjacent relevant first cells 19. In an embodiment the first and second cells 19, 20 can be distributed around the periphery such that the angles α and β will be the same, but an angle γ between lines J through a first cell 19 and an adjacent trailing cell 20, that is the second cell following the first cell 19 in the direction of rotation W of the star wheel 4 is smaller than the angle δ between the lines J through said second cell 20 and the following first cell 19. In an embodiment the angles α, β can be 120 degrees, the angle γ can be between 5 and 60 degrees, more specifically between 10 and 45 degrees, for example approximately 30 degrees. The angle δ can be about (α-δ), which can e.g. be about 90 degrees.

In an embodiment the edges 24, 25, 26, 27 can extend substantially parallel to the line J extending through the relevant cell 19, 20. In an embodiment the second cells 20 can be relatively small compared to the first cells 19. The first cells 19 can have a width B1 measured between the leading and trailing edge 24, 25 perpendicular to the relevant line J through the cell 19 larger than a width B2 of the second cells 20. In an embodiment the first cells 19 can be distributed such that when a one of the first cells 19 is positioned adjacent the outlet opening 10 of the slot 5, a following relevant first cell 19 is positioned adjacent the inlet opening 9 of the slot 5. A second cell 20 can be positioned in between, extending within the housing and/or in the slot.

As can be seen in FIG. 2 at one side of the slot 5 a first tape dispenser 3 is provided, comprising a roll of adhesive tape 39. A second tape dispenser 40 is provided, for holding a second role of tape 41. In an embodiment the first tape dispenser 3 can be provided at a side of the slot 5 opposite the side of the second tape dispenser 40. The second tape dispenser 40 can be provided at a side of the slot at which the knife carrier 28 is also provided. Sides to the slot should be understood as to the left or right of the line L as seen in a front or rear view of the apparatus 1. Near the knife carrier 28 a tautening device 42 is provided, preferably in the housing 2. The tautening device 42 comprises an arm 43, pivotally connected to the housing 2 in a pivot point 44. A side arm 45 is connected to the arm spaced apart from the pivot point 44, extending substantially in a direction away from the star wheel 4. From the first tape dispenser 3 adhesive tape 39 is fed over the periphery 21 of the star wheel 4, at least past a first cell 19 near or adjacent to the inlet opening 9 of the slot 5, an adhesive side 49 of the tape 39 extending outward, away from the star wheel 4. At the side of the slot 5 near the inlet opening 9, between the slot 5 and the arm 43, a guide 50 for the second tape 41 dispensed from the second tape dispenser 40 is provided, for guiding the second tape 41 towards the periphery 21 of the star wheel 4, at a position downstream from the inlet 9. The second tape 41 is preferably non adhesive tape, such as but not limited to paper tape. The second tape preferably is easily tearable, preferably more easily that the adhesive tape 39. The second tape is led from the second tape dispenser 40 over the sides of the guide elements 48A, 48B facing away from the star wheel 4 and over the side of the pin 47 facing the star wheel 4, and then through the guide 50 towards the periphery 21 of the star wheel 4, over which it is led in a downstream direction, towards the outlet opening 10, adhered to the adhesive tape 39. It should be noted that the second tape could also be omitted in a device of the present disclosure.

In the position of FIG. 2 a bundle of products, such as the stems 90 of a bunch of flowers, schematically shown in cross section in FIG. 2 directly above the star wheel, in the inlet opening 9, can be pushed into the relevant first cell 19 adjacent the inlet opening 9, in the direction F, thereby pushing the tape 39 extending over the opening of the relevant first cell 19 into the cell 19, adhering at the same time to the stems 90 of the flowers and dispensing tape 39. By pushing the stems 90 further in the general direction F the star wheel 4 will be rotated in the direction W, leading the stems 90 through the slot 5 towards the outlet opening 10. Tape 39 will be dispensed from the first dispenser 3. Since the second tape 41 is adhered to the first tape 39 at the downstream side of the relevant first cell 19, tape 41 will also be dispensed from the second dispenser 40. The tape will be kept taut by the tautening device 42. The first tape 39 and the second tape 41 adhered thereto will thus be extended over the second cell 20 following the relevant first cell 19.

Figure 4:
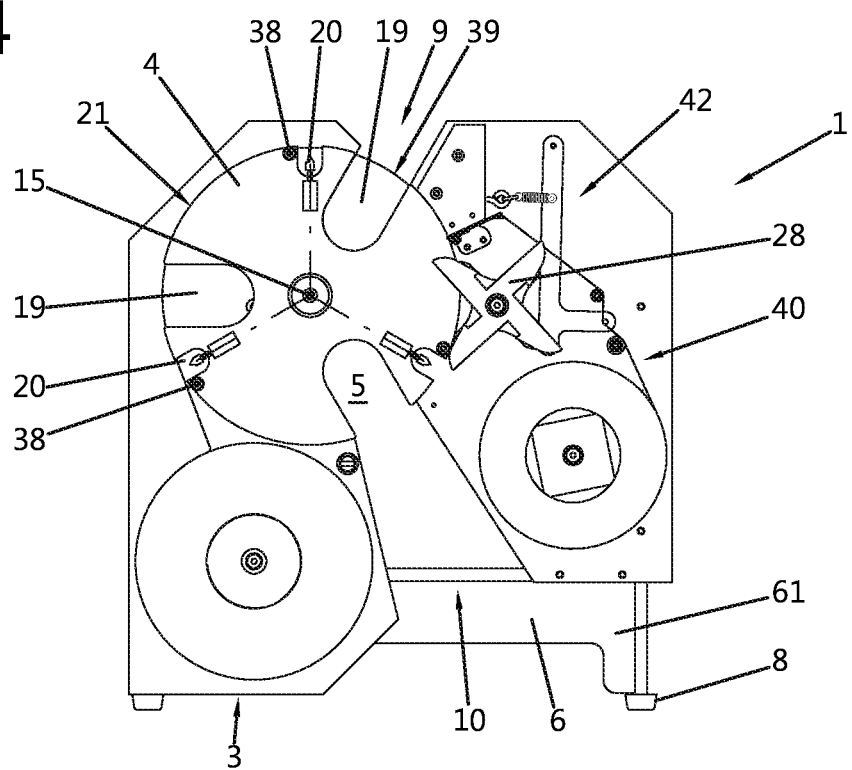
FIG. 4 shows schematically in frontal view, opened, an apparatus of FIG. 3.
Figure 4A:
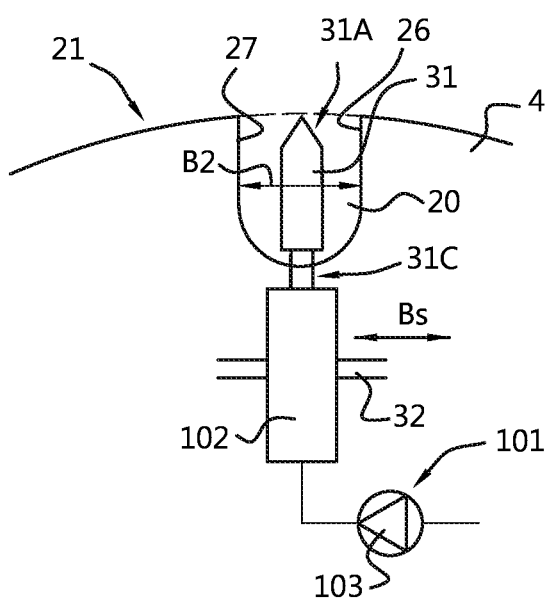
FIGS. 4A and 4B schematically disclose two positions of a knife in a star wheel.

As can for example be seen in FIGS. 4A and B and FIG. 9A-E, in each second cell 20 a knife 31 or an anvil 31B can be provided, movable in a direction substantially radially to the star wheel 4. This will be further elucidated here with respect to a knife 31 in the second cell 20. For an anvil 31B the same applies accordingly.

In the or each cell 20 a knife 31 is provided, preferably in or on a knife carrier 31C, which is connected to a system 101 for moving the knife 31 such that a cutting edge 31A of the knife 31 can be pushed against and through a tape 39 or combination of tapes 39, 41 extending over the second cell 20. Such system 101 can for example be a pneumatic or electric or electro magnetic system with a cylinder 102 operable for moving the knife 31. Such cylinder 102 can for example be provided on or in the star wheel 4. Such system 101 can for example be a mechanically driven system, such as for example a system comprising a cam shaft. Such system 101 can for example be servo driven.

When the star wheel 4 is rotated further in the direction W, an operating element 38 for example near a second cell 20 upstream adjacent the relevant first cell 19 in which the stems S can operate the knife 31 at an appropriate moment, from a first position, preferably fully retracted into the second cell 20, i.e. below the periphery 21, as for example shown in FIG. 4A and in FIG. 9A F in solid lines, to a second position in which the cutting edge 31 extends beyond the periphery 21, i.e. outside the cell 20, such that the tape is or tapes 39, 41 are cut. The operating element 38 can for example comprise or be a position sensor, optical sensor, contact sensor or the like. The knife and/or the system 101 preferably are arranged such that the knife 31 is brought back into a first position. The stems S are thus enclosed between the first tape 39 extending to a high extent and preferably almost entirely around the bundle of stems S and the second tape 41 extending over a gap 52 between two parts of the first tape 39. This makes it easy to remove the tapes 39, 41 from the stems, by tearing one of the tapes, preferably the second tape 41 by pulling the two tabs 53A, 53B, formed on either side of the gap 52, apart.

The relative positions of each first cell 19 and the adjacent upstream second cell 20 define the length 54 of the tabs 53. Once the tapes 39, 41 have been cut by the knife 31, the star wheel 4 will rotate relative to the tapes, until the stems S are released from the cell 19 and a further bundle of stems S is introduced into the next first cell 19 then adjacent the inlet opening 9. By reducing the distance D between the cell 19 and the trailing second cell 20 in which the knife 31 cuts the tapes 39, 41 the tab length 54 can be limited, reducing use of tape and preventing excessive tab lengths, which is especially desirable when bundles of products have to be tied or sealed having a relatively large size in cross section. In embodiments the width B2 of the second cell 20 can be larger than the corresponding width of the knife 31, which can allow for adjustment of the position of the knife 31 within the cell 20, such that the distance D between the first cell 19 and the cutting edge 31A can be adjusted, for adjusting the tab length. As can be seen in FIG. 9, the width B2 of the second cells can also be substantially the same as the width of the knife 31 and/or knife carrier 31C, such that the knife can at least partly be guided by sides 26, 27 of the second cell 20.

As can be seen in e.g. FIG. 4B and FIG. 9A-E an anvil 31B can be provided, for example in the housing, such that when the knife 31 is brought into the second position, it can press the tape at least partly towards or even against the anvil aiding in cutting the tape or tapes. However, in embodiments as shown also no such anvil can be provided, wherein for example a tautening means is provided for tautening the or each tape during cutting of the tape or tapes.

FIGS. 3 and 4, 7 and 8 disclose an alternative embodiment of an apparatus according to the description, having the same or a similar star wheel 4, first and second tape dispensers 3, 40, knives 31 and tautening device 42. In this embodiment the housing is divided basically in two parts 55, 56, the slot 5 extending between and being substantially defined by facing edges 57, 58 of the two parts 55, 56. A carrier 59 is provided, connecting the first and second part 55, 56. The carrier 59 is substantially U shaped, extending substantially perpendicular to the sides 12, 13 of the housing 2, having a central element 60 and two arms 61, connecting ends of the central element 60 with the first and second part 55, 56 respectively. The carrier therefore extends at a distance from the slot 5. In this embodiment the apparatus 1 can be mounted with the carrier on a working surface (not shown) such that a bundle of products such as flowers with stems S can be pushed from the slot 5 through the outlet opening 10 further in the direction of movement they had when passing through the slot 5.

In the description the embodiments are disclosed having the slot 5 or at least the line L extending substantially vertically. It is however obviously possible to have the slot extend in any desired direction and position, for example substantially horizontally or inclined relative to a horizontal and vertical plane.

In an embodiment the inlet opening 9 and first cell 19 can have corresponding widths. In another embodiment the width of the first cell 19 can differ from the inlet 9, for example smaller. The width B1 can for example be between 20 and 100 mm, for example between 30 and 80 mm. In an example the width B1 can be about 30 mm, about 40 mm or about 50 mm. The star wheel can have a diameter of any size, for example between 100 and 500 mm. In an example the star wheel can have a diameter of between 200 and 300 mm, for example about 240 to 250 mm. These sizes are only given by way of example. The star wheel 4 need not be circular. In an embodiment different star wheels 4 can be provided, interchangeable in the same housing. Different star wheels 4 can have for example but not limited to different positions of the first and second cells, different numbers of such cells, different sizes of first and/or second cells or combinations thereof, suitable for for example different sizes of bundles of products or bags or different products. Star wheels can have cells having for example a padding for protecting products from damage by the forces exerted thereon when being bundled, tied and/or sealed.

FIGS. 4A and B and FIG. 9A-E show embodiments of a knife 31 in a second cell 20, movable by a system 101. As indicated, instead of the knife it can also be an anvil 31B movable in the star wheel 4, which anvil can then be pushed towards a knife 31 in the housing, for cutting the tape or tapes.

Figure 4B:
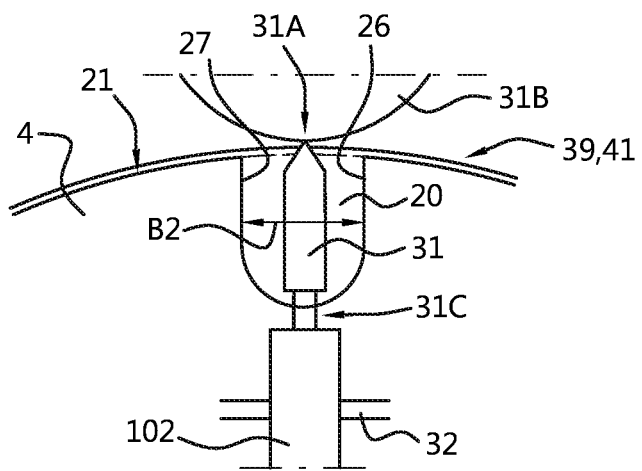
Figure 5:
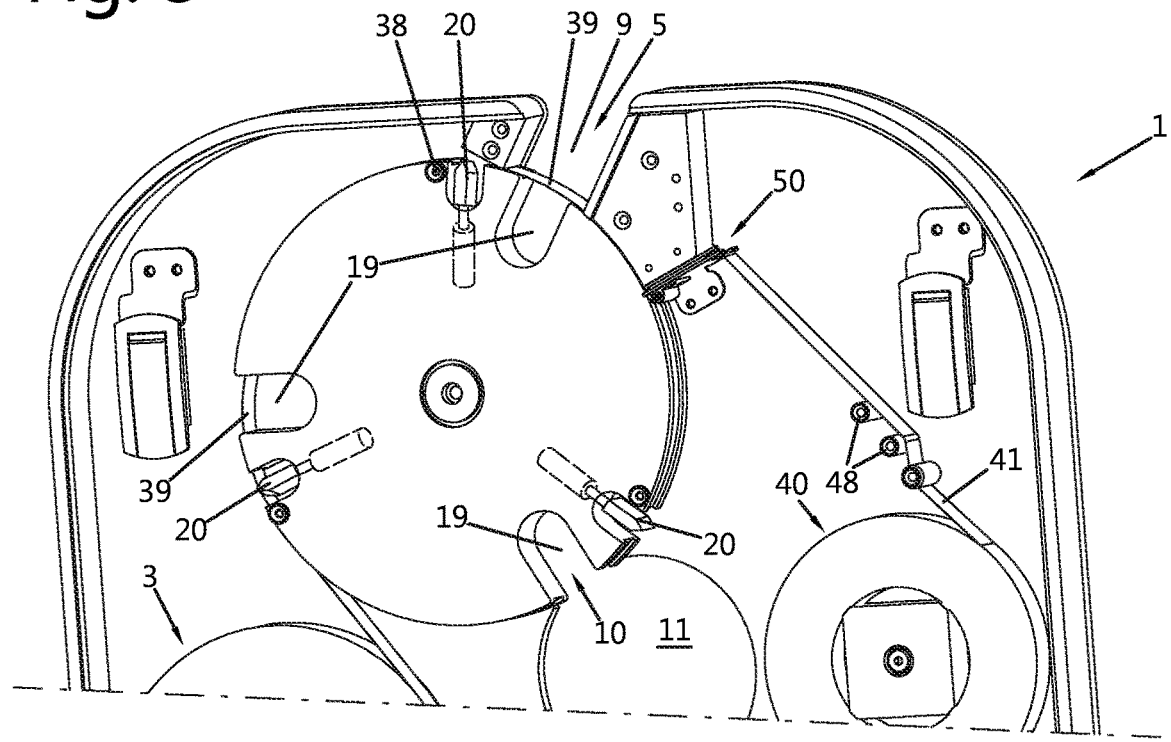
FIG. 5 shows schematically part of an apparatus of FIG. 1 or 3, in a first position.
Figure 6:
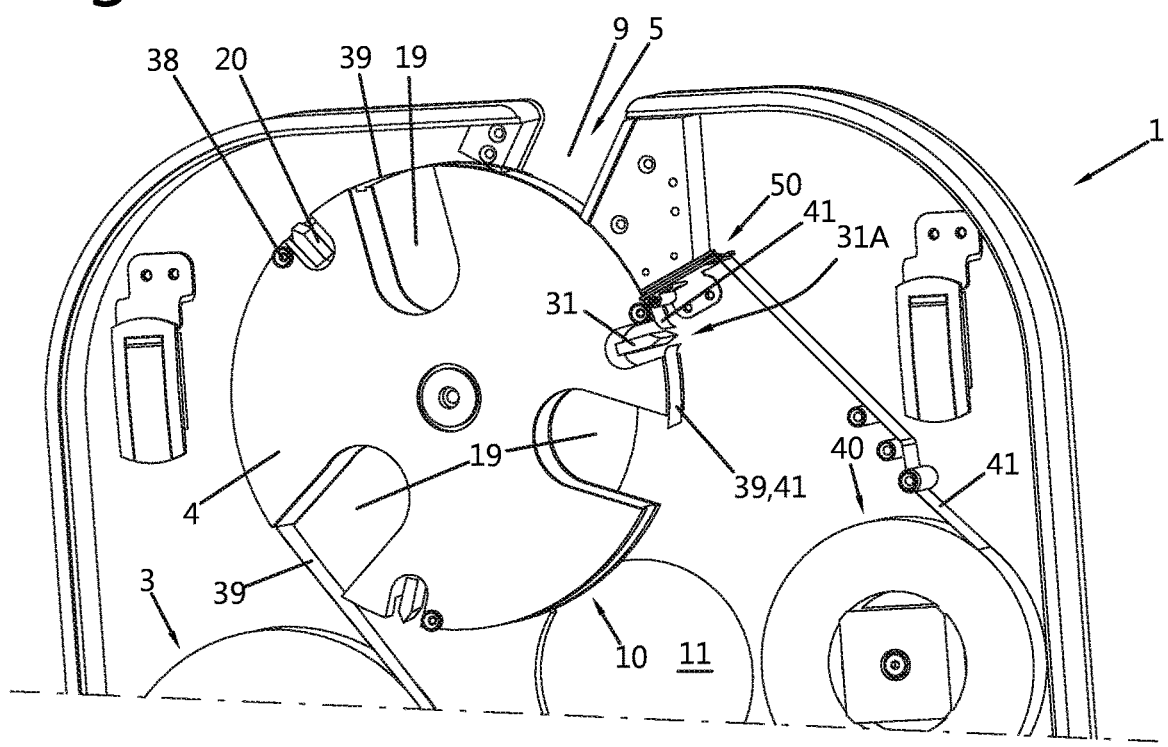
FIG. 6 shows schematically part of an apparatus of FIG. 1 or 3, in a second position.
Figure 7:
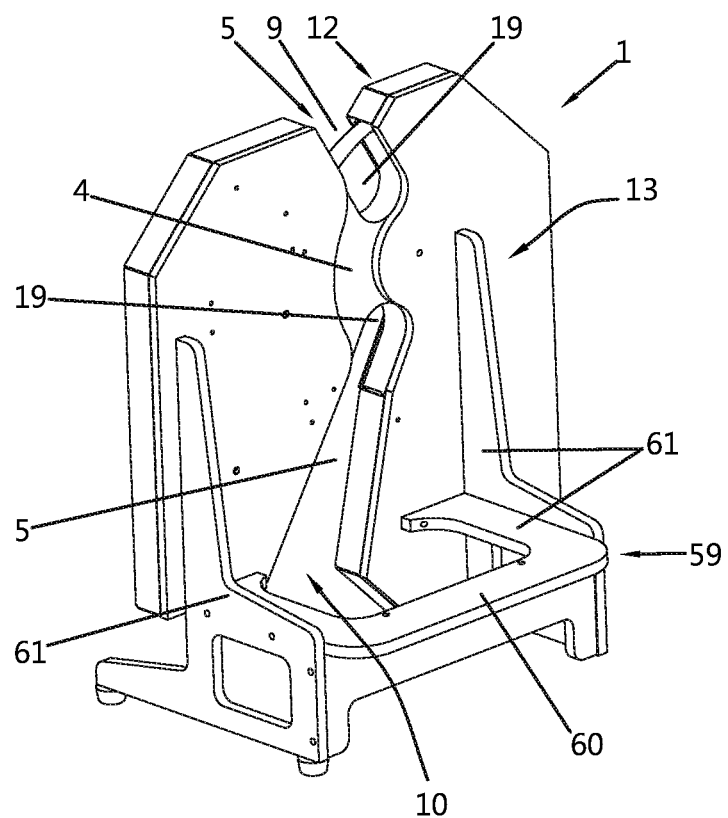
FIG. 7 shows schematically in perspective view an apparatus of FIG. 3, from the rear.
Figure 8:
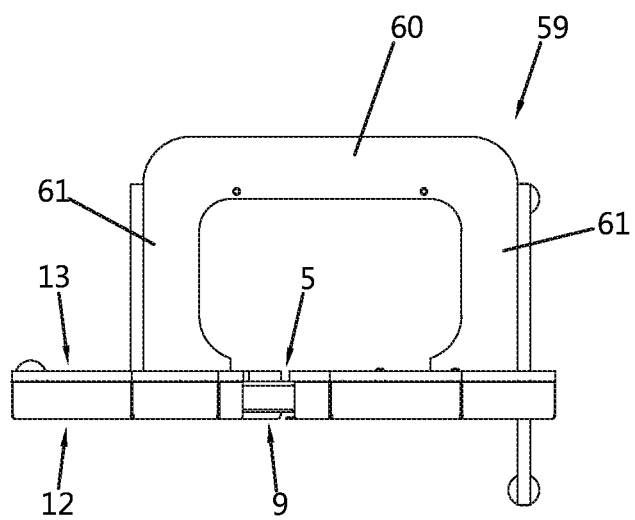
FIG. 8 shows schematically in top view an apparatus of FIG. 7, with part of a bundle engaging the star wheel.

FIGS. 4A and B show a knife 31 mounted on a cylinder 102 which can be operated for moving the knife 31 between the first position, shown in solid lines, and a second position, shown in broken lines in FIG. 9. For control of the cylinder an operating system 101 can be provided, schematically shown as a pump symbol 103. In the embodiment of FIGS. 4A and B the second cell 20 has a relatively wide width B2. The cylinder 102 is mounted on a rails 32, such that the knife 31 can be repositioned in the cell 20 in substantially tangential direction Bs. In FIG. 4A the first position is shown, in which the cutting edge 31A is below the periphery 21, i.e. between the periphery 21 and an axis of rotation of the wheel 4. In FIG. 4B the knife is shown in the second position, in which the knife edge 31A extends outside the star wheel or beyond the periphery 21. In this embodiment the cutting edge 31A is pushed against an anvil 31B, through the tape 39 or combination of tapes 39, 41, thus cutting the tape or tapes.

Figure 9A:
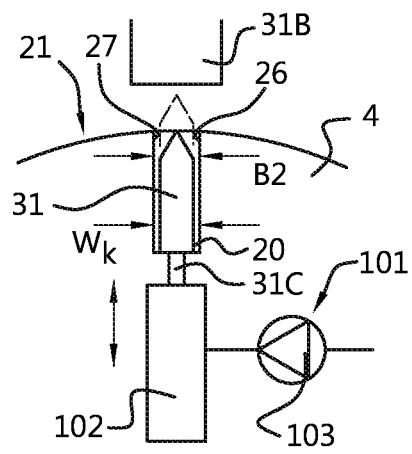
FIG. 9A-H schematically show different embodiments of knives and anvils suitable for use in the different embodiments of the present disclosure.

In FIG. 9A a similar construction as shown in FIGS. 4A and B is shown, in which however the width B2 of the second cell 20 measured along the periphery 21 is substantially equal to the width Wk of the knife 31. Thus the knife 31 is guided by the side surfaces 26, 27 of the cell 20.

Figure 9B:
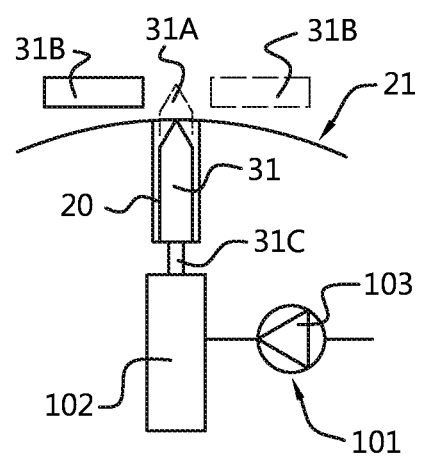

In FIG. 9B a knife 31 and second cell 20 are shown, similar to FIG. 9A, in which the anvil 31B is provided to one or opposite sides of the cutting edge 31A of the knife 31.

Figure 9C:
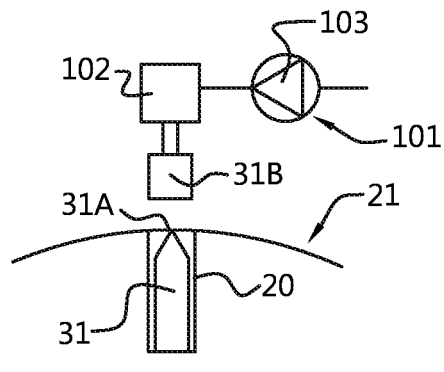

In FIG. 9C a knife 31 is positioned stationary in a second cell 20, with a cutting edge 31A in or adjacent to the periphery 21. In this embodiment an anvil 31B is movable by a system 101, here shown as comprising a cylinder 102 for moving the anvil 31B against the knife's cutting edge 31A, for cutting the tape or tapes.

Figure 9D:
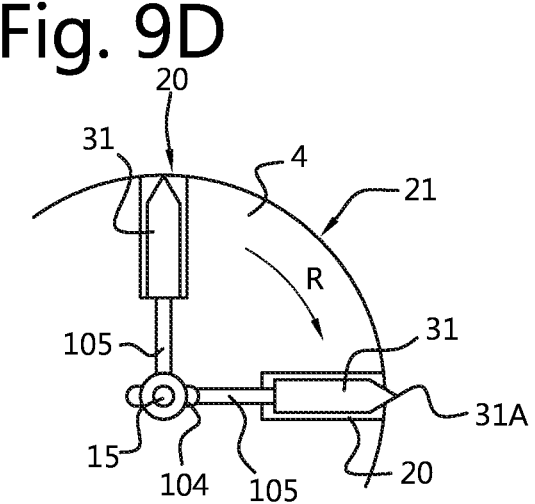

In FIG. 9D a knife 31 is shown in a second cell 20, similar to FIGS. 9A and 9B, in which the movement of the knife between the first and second position is initiated by a cam 104 on an axis 15 of rotation of the star wheel 4. By rotating the star wheel 4 around the axis 15, a pusher 105 of the knife 31 will engage the cam 104, pushing the knife into the second position, as shown in FIG. 9D to the right. When rotating the star wheel 4 further in direction R, the knife will be moved back into the first position, for example by a spring, mechanically, pneumatically, or for example by using the knife as a piston in the second cell 20, sealed such that the movement into the second position creates a partly vacuum behind the knife, biasing the knife towards the first position.

Figure 9E:
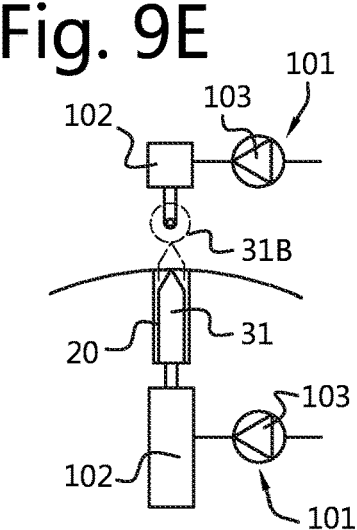

In FIG. 9E a knife 31 is shown similar to that of e.g. FIGS. 9A and B, wherein additionally an anvil 31B is shown, similar to that of FIG. 9C, such that both an anvil and a knife can move for cutting the tape or tapes.

Figure 9F:
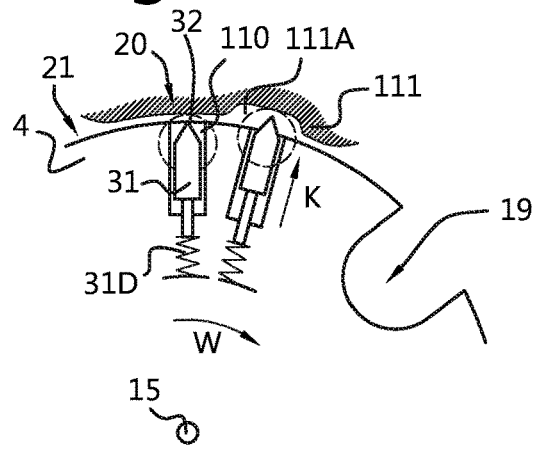

In FIG. 9F part of an apparatus is shown in which the knife 31 is supported on a spring 31D which biases the knife 31 in an outward direction K, preferably substantially radially. A guide element 110, such as for example a wheel or bearing, can be connected to the knife 31 or knife carrier 31C, which can be guided by a guide 111, for example a stationary guide extending along the wheel 4, such that over a relevant part of a rotation of the wheel 4 the knife 31 is pushed inward, towards the axis 15 of the star wheel 4, against the biasing force of the spring 31D. In a position where the knife 31 has to be brought into the second position for cutting the tape or tapes, the guide 111 may be interrupted or have an appropriate outward curve 111A, for allowing the spring 31D to force the knife 31 outward. Preferably the guide 111 is formed such that after cutting the knife 31 is pushed back inward again by the guide element 110. Similar guides and guide elements can be used, also in other embodiments of the disclosure, for moving the knife 31 or anvil in at least one direction.

Figure 9G:
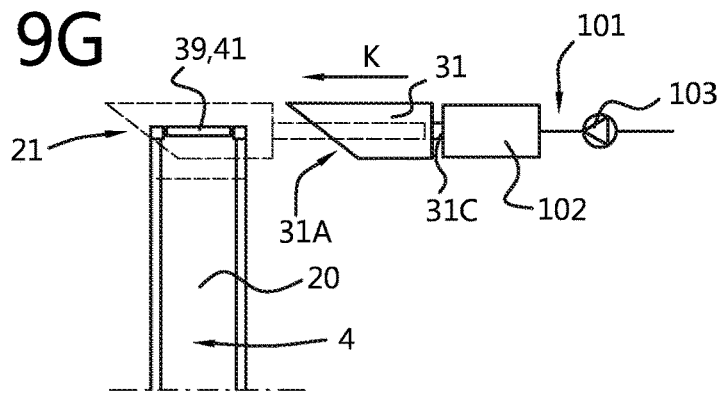

In FIG. 9G a side view is shown, showing a knife 31 which can move in a substantially axial direction K, from a first position, shown in solid lines, substantially next to a side of the star wheel to a second position, shown substantially in broken lines, extending through a cell 19, 20, especially a second cell 20, cutting the or each tape 39, 41 during said movement from the first to the second position. In this embodiment the cutting edge 31A of the knife 31 may extend at an angle relative to the direction of movement K between the first and second position.

Figure 9H:
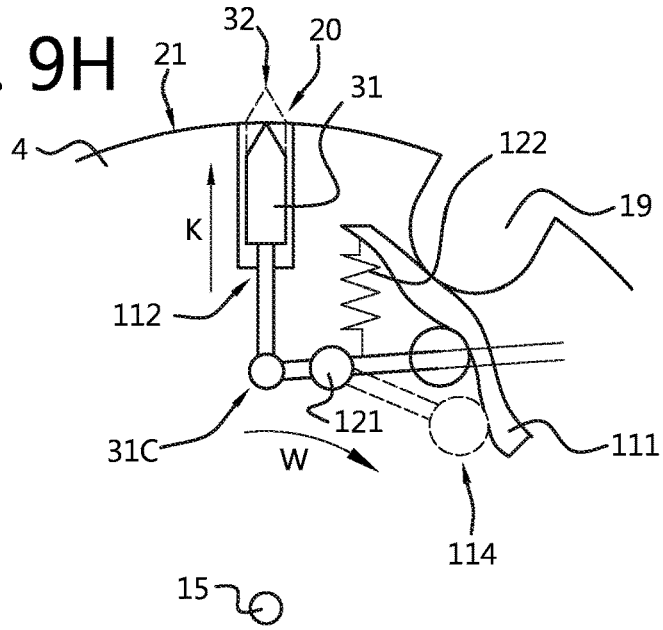

FIG. 9H discloses an embodiment of a knife 31, carried on a carrier 31C which is pivotable around an axis 121 extending substantially parallel to the axis 15 of the wheel 4. The carrier 31C may be hooked. A first end 112 of the carrier 31C carries the knife 31, the opposite end 114 carries a guide element 110, which with the knife 31 in the first position, shown substantially in solid lines, is in a position outward from the axis 15. A guide 111 is provided along part of the star wheel 4 which is engaged or can be engaged by the guide element 110 and which is profiled such that it can guide the guide element 110 in a direction substantially towards the axis 15 when rotating the star wheel 4, in direction W, thereby pivoting the carrier 31C and thus forcing the knife to the second position, shown substantially in broken lines, hence cutting tape. The carrier 31C can be biased towards the first position, for example by a spring 122 and/or the guide 111 may be provided with a guide part for guiding the guide element 110 back to the first position.

It is especially advantageous to have multiple knives 31 in a wheel, for example three, four or five, in stead of a single knife positioned along the periphery, since it reduces wear of the knives considerably. Moreover, by having one or more knives movable in the star wheel the timing of cutting may become less critical to the process.

In embodiments one or more knifes 31 can be fixed in the wheel 4, having a cutting edge 31 extending outward, wherein an anvil 31B is movable towards the knife, for cutting the or each tape and/or wherein a tape tautening system is provided for pulling the tape taut over the periphery during cutting.

Figure 10:
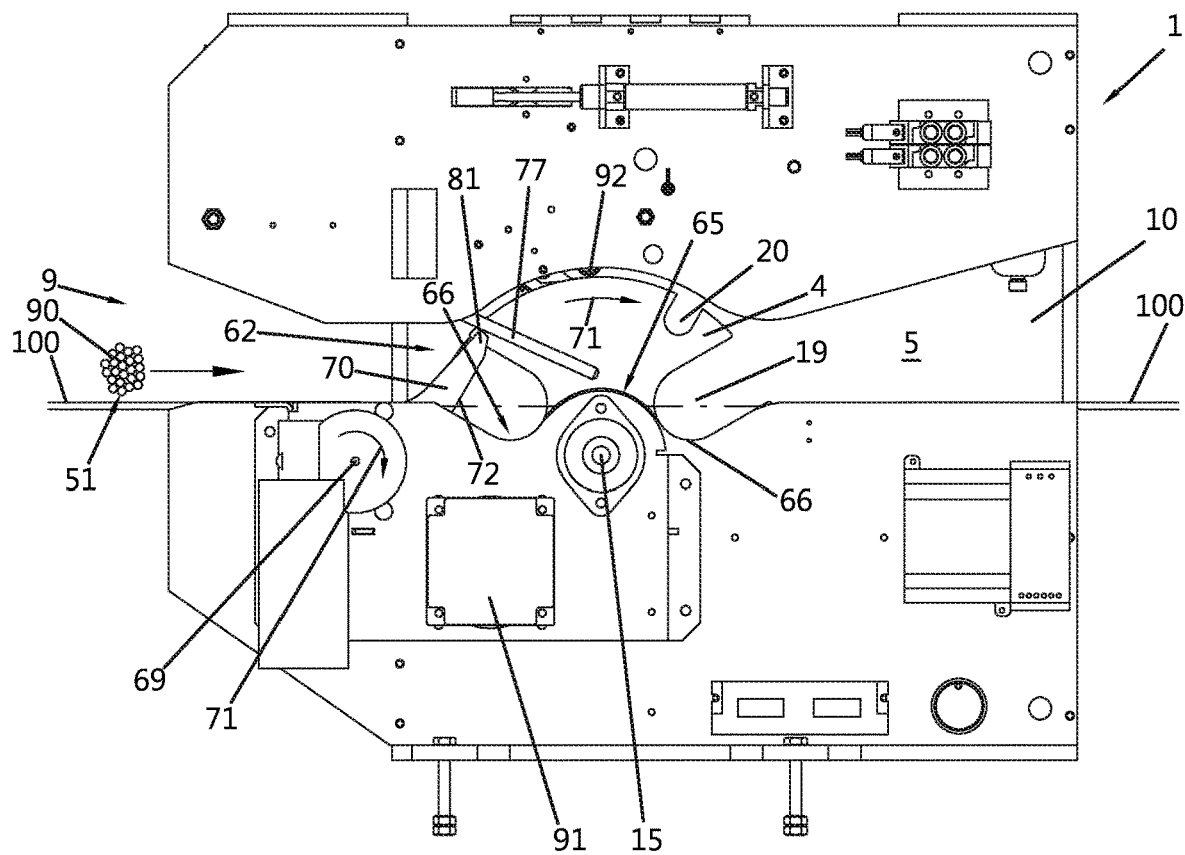
FIG. 10 shows schematically in frontal view an apparatus, in a further embodiment.
Figure 11:
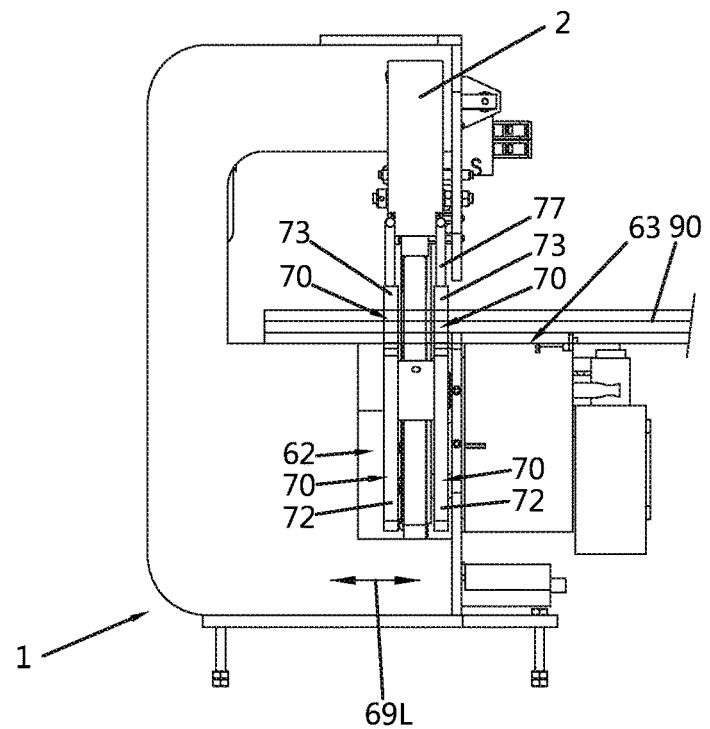
FIG. 11 shows in side view an apparatus of FIG. 10.
Figure 12:
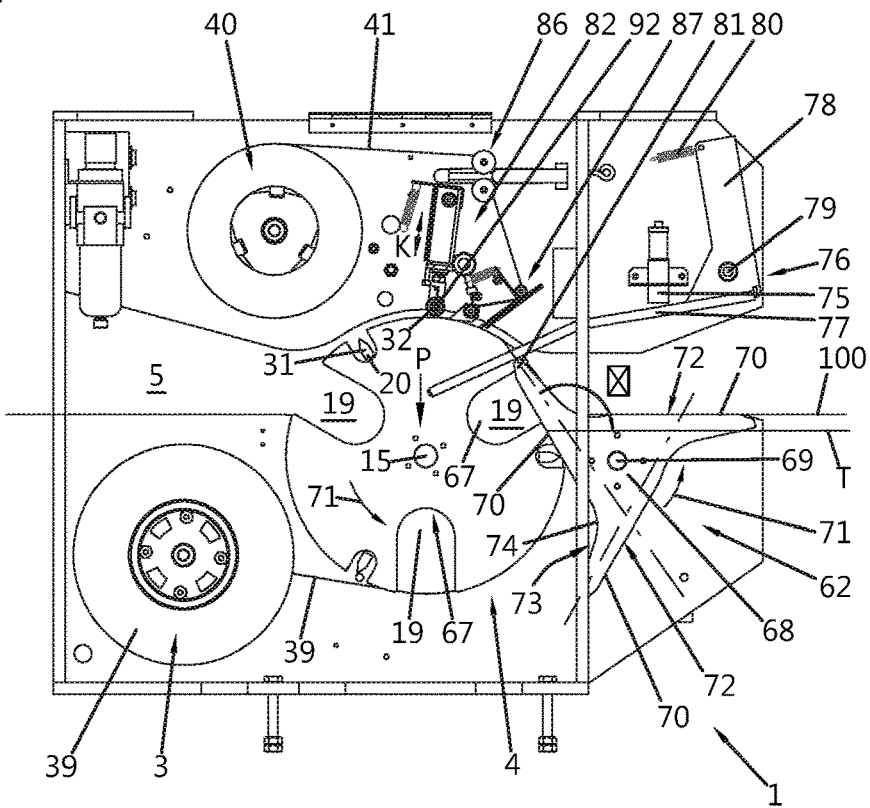
FIG. 12 shows in rear view an apparatus of FIGS. 10 and 11.

FIGS. 10-12 show a further embodiment of an apparatus 1, again comprising a housing 2, at least a first tape dispenser 3 and a star wheel 4. A slot 5 is again defined by the housing 2, extending between an inlet 9 and an outlet 10. As can be seen, especially in FIGS. 10 and 12, the star wheel 4 extends partly in the slot 5. Products fed through the slot 5 therefore have to engage the star wheel 4. In this embodiment the star wheel 4 is substantially the same as disclosed in the previous figures. However, in all embodiments star wheels 4 could be used having the first and second cells 19, 20 distributed differently, for example evenly spaced around the periphery, whereas the cells 19, 20 could all have the same sizes.

In this embodiment an urging device 62 is provided, at least partly upstream of the star wheel 4. A support surface 63 is provided at least on one side of the slot 5, for supporting products to be tied and/or a transport device fed over the support surface 63. Such transport device can for example be a substantially flexible conveyer 100, which can in embodiments have a relatively soft top side for supporting the products or parts thereof. As can be seen in for example FIG. 13, the support surface 63 can have a wavy portion 64 next to the star wheel 4, such that when the support surface 63 extends substantially horizontally a first part 65 of the transport surface 63 next to the star wheel 4 extends higher than an axis 15 of the star wheel 4 and two adjacent parts 66 of the supporting surface 63 extend on either side of the first part 65 at a lower level. The structure is preferably chosen such that when a first cell 19 is open to the inlet opening 9, an edge flush with the transport surface or transport element supported thereon, another first cell is open to the outlet in a similar manner, whereas the curvature of the wavy part is such that upon rotation of the star wheel to bring the relevant cell from the inlet side to the outlet side, a bottom portion 67 of the cell follows the wavy pattern of the first part 65, thus allowing support of the product or products by the supporting surface, directly or indirectly, during such movement.

As can be seen, in FIG. 12 especially, the urging device 62 can have a central portion 68, mounted on or formed by an axis of rotation 69, preferably extending substantially parallel to the axis 15 of the star wheel 4. In the embodiment shown the urging device comprises three pairs of protrusions or fingers 70, extending substantially tangential to the axis 69, at even angles τ of 120 degrees, between their length directions T. Of each pair the fingers 70 are spaced apart in the length direction 69L of the axis 69, such that of each pair the fingers extend on opposite sides of the star wheel 4, at least partly, as is especially clear from FIG. 11. The star wheel 4 and the urging device 62 have the same direction of rotation 71, in FIG. 12 counter-clockwise, and can both be driven by a motor. Each finger 70 has, seen in the direction of rotation 71, a forward side forming an edge portion 72 for urging products into a cell 19 of the star wheel. This edge portion can be substantially straight and substantially parallel to the length direction T of the finger 70. The opposite, trailing side 73 of the fingers 70 can extend at a slight angle relative to the length direction T and/or the edge portion 72, and there can be a bent transition position 74 between the edge portion 72 of one finger and the trailing side 73 of the an adjacent finger 70. As can be seen the edge portion 72 can be brought into a position in which it extends substantially parallel to and substantially at the same level as the adjacent support surface 63. In FIG. 12 this position is shown, wherein the adjacent finger preceding this finger 70 extends to a side of a cell 19 of the star wheel 4. Above the slot 5 near the urging device 62 a sensor 75 is mounted, such as for example an optical sensor, registering during use movement of products into the slot 5, over fingers 70 of the urging device 62.

Above the slot 5 furthermore a pressing device 76 can be mounted. In the embodiment shown the pressing device 76 comprises two substantially parallel arms 77, extending partly on opposite sides of the star wheel 4, above the fingers 70. The arms 77 are mounted on a common carrier 78, mounted on an axis of rotation 79 and biased in a downward direction P, for example by one or more springs 80 and/or gravity. As can be seen in FIG. 12 the arms 77 can rest on ends 81 of the fingers 70, such that a rotation of the urging device 62 will move the arms up and down, pivoting around the axis 79.

Preferably the urging device has a first number N1 of fingers or at least edge portions 72, whereas the star wheel has a second number N2 of first cells 19, wherein the first and second number N1, N2 are related by the formula N1=N*N2 or N2=N*N1, wherein N is an integer. In the embodiment shown N=1, resulting in the same number of cells 19 and fingers 70. N could also be a different number, for example but not limited to 2 or 3. When N=1 the revolutions of the star wheel 4 and the urging device 62 can be synchronised one to one.

Figure 13:
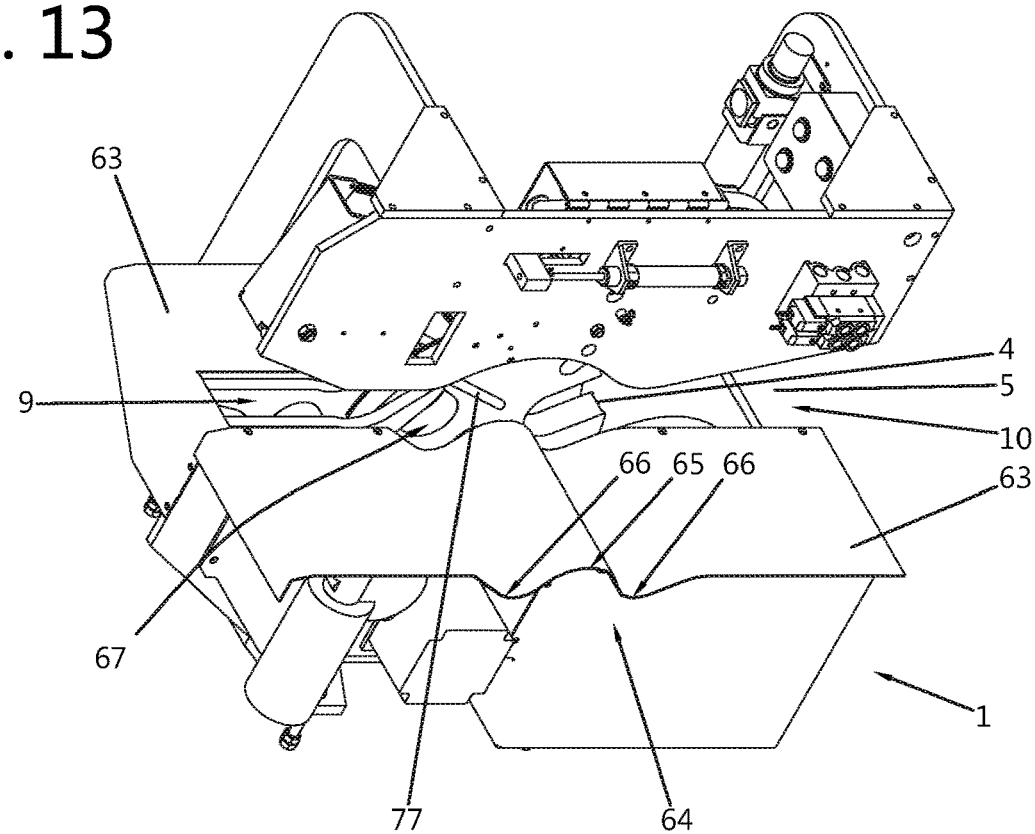
FIG. 13 shows in perspective view an apparatus of FIGS. 10-12.

In FIG. 13 in perspective view a device or apparatus 1 is shown, according to FIGS. 10-12. Such device can be used as follows, referring also to the previous description of other embodiments.

A product or bundle of products 51, such as flowers, vegetables, rod like elements or the like, which may or may not be enclosed at least partly in a wrap or bag, can be fed into the slot 5 from the inlet 9, over a pair of fingers 70. In FIGS. 11 and 12 stems 90 of a bundle of flowers are shown as a bundle of products 51 to be tied. When the stems 90 are moved over the fingers 70, for example by a transport conveyer 100, extending over the support surface 63, and below the sensor 75, a control unit 91 will drive the star wheel 4 and the urging device 62 in the direction 71, such that the edge portion 72 will urge the stems 90 together and into the cell 19 of the star wheel 4, against the tape 39 extending over said cell 19. By rotating further the tape will be forced into the cell, together with the stems 90, as discussed before, whereas the arms 77 of the pressing device will come down and will be forced against the stems 90 on either side of the star wheel 4, urging the stems 90 down towards the bottom portion 67 thereof, keeping them together during tying. Then the star wheel 4 and urging device will be rotated further, such that (if applicable) paper or such tape 41 will be provided in an earlier described manner over part of the adhesive tape 39, forming a tie as discussed and shown in for example FIG. 2, in a position leaving the apparatus 1. The knife 31 will then be moved from the first to the second position, preferably out of and back into the relevant second cell 20, for cutting the tape 39 or combined tapes 39, 41, such that the tied stems 90 or at least products 51 can be removed when the star wheel is rotated further, such that the relevant cell 19 holding the stems 90 will be flush with the slot 5 again. For each bundle 51 to be tied the star wheel 4 and urging device 62 will be rotated over the same angle of approximately 120 degrees.

By using the urging device 62 and/or the pressing device 76, and preferably both, the products can be brought into and/or held in a compact bundle during tying thereof.

It shall be clear that an urging device 62 and/or a pressing device 76 could also be used in the same or similar manner with embodiments of the apparatus 1 as discussed before.

Figure 14A:
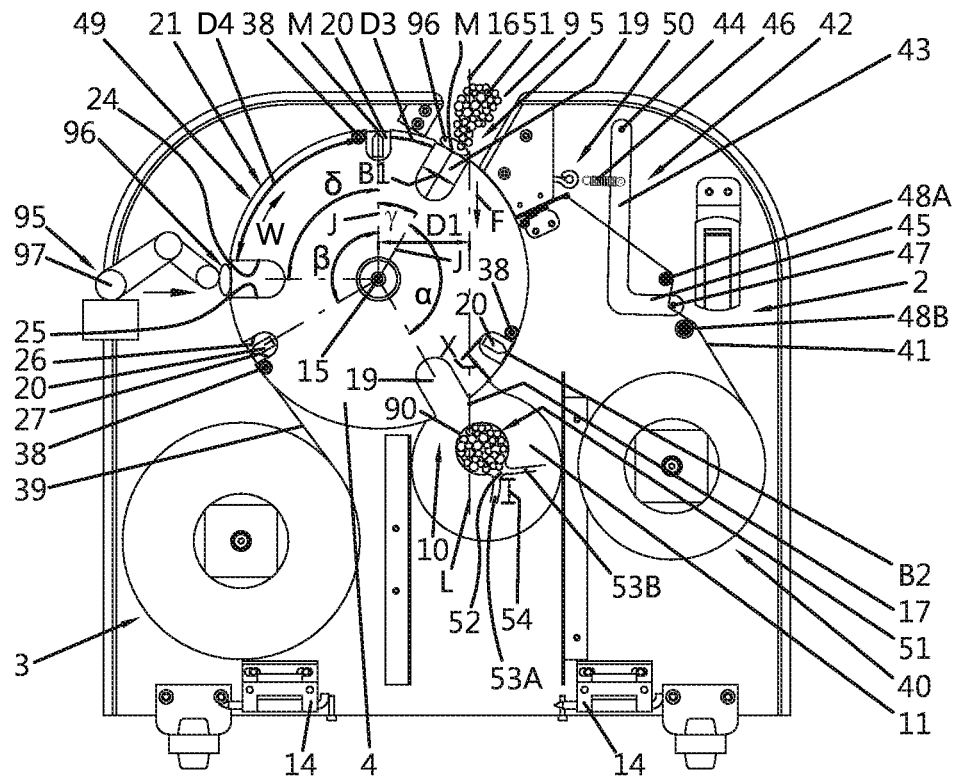
FIG. 14A-B show the apparatus of FIGS. 10-13, with a bundle of flowers, together with the supply of containers to be tied with the bundle.
Figure 14B:
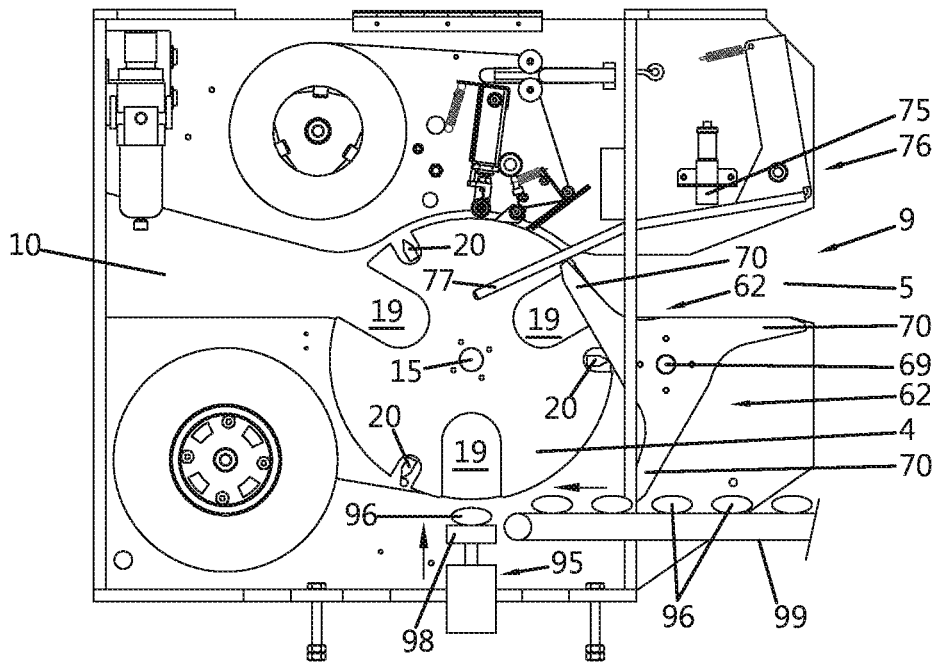

In FIGS. 14A and B schematically two embodiments are shown of an apparatus 1, for example according to FIGS. 2 and 12 respectively, combined with a device 95 for feeding containers or other items 96 to the tape 39 between the first dispenser 3 and the slot 5. In the embodiment shown in FIG. 14A the device 95 comprises or is formed by a pick and place type robot 97, picking containers or items 96 from a supply and pushing the container or item 96 against the adhesive side of the tape 39 at a first cell 10, such that when released by the robot 97 the container or item 96 will rotate with the star wheel 4 towards the inlet side 9 of the slot. In FIG. 14B the device 95 comprises a movable table 98 below the star wheel 4, on which a container or item 96 is placed, for example by a transport element such as but not limited to a conveyer, or a robot. The table is then pushed up, for example pneumatically or hydraulically, electrically or mechanically, such that the container or item 96 is adhered to the adhesive side of the tape 39, preferably in a position at a first cell 19. Again, when the star wheel 4 is then rotated such that the said cell 19 comes flush with the slot, the item or container 96 will be facing the slot inlet side 9. Alternative solutions for attaching the containers or items 96 can be envisaged and will be directly clear to the person skilled in the art. For example the belt 99 supplying the items or containers 96 could be fed directly under the star wheel, such that the items or containers 96 are adhered to the tape 39 directly and lifted off the belt by rotation of the star wheel 4.

When in this embodiment a product or bundle of products 51, such as the stems 90 are forced into the relevant cell 19, pushing the tape 39 into the cell, the container or item 96 will be enclosed between the tape 39 and the product or bundle of products 51, such that it will be tied to the product or bundle 51 simultaneously. An example of a container or item 96 can be, but is not limited to a bag, sachet, flask, bottle, leaflet, gift or the like. When bundling flowers the item 96 can for example be a sachet containing nutrition or fertiliser. When packaging produce the item can for example be additives to be used with the produce, such as but not limited to herbs, spices or the like.

In the embodiments described and shown in the drawing, there is a first and a second dispenser 3, 40. However, in all embodiments it could be sufficient to have one tape dispenser only, especially the first dispenser for the adhesive tape.

At least one of the knife arrangement or knife carrier, the star wheel and the urging device and/or pressing device, and/or at least one dispenser 3, 40 could be connected to a counter, registering the number of revolutions or cutting actions during a period, which will be indicative for the number of products or bundles of products that have been tied during that period. This information can be read directly from the counter or could be transferred to another location, for example by wireless, sms or the like.

Figure 15:
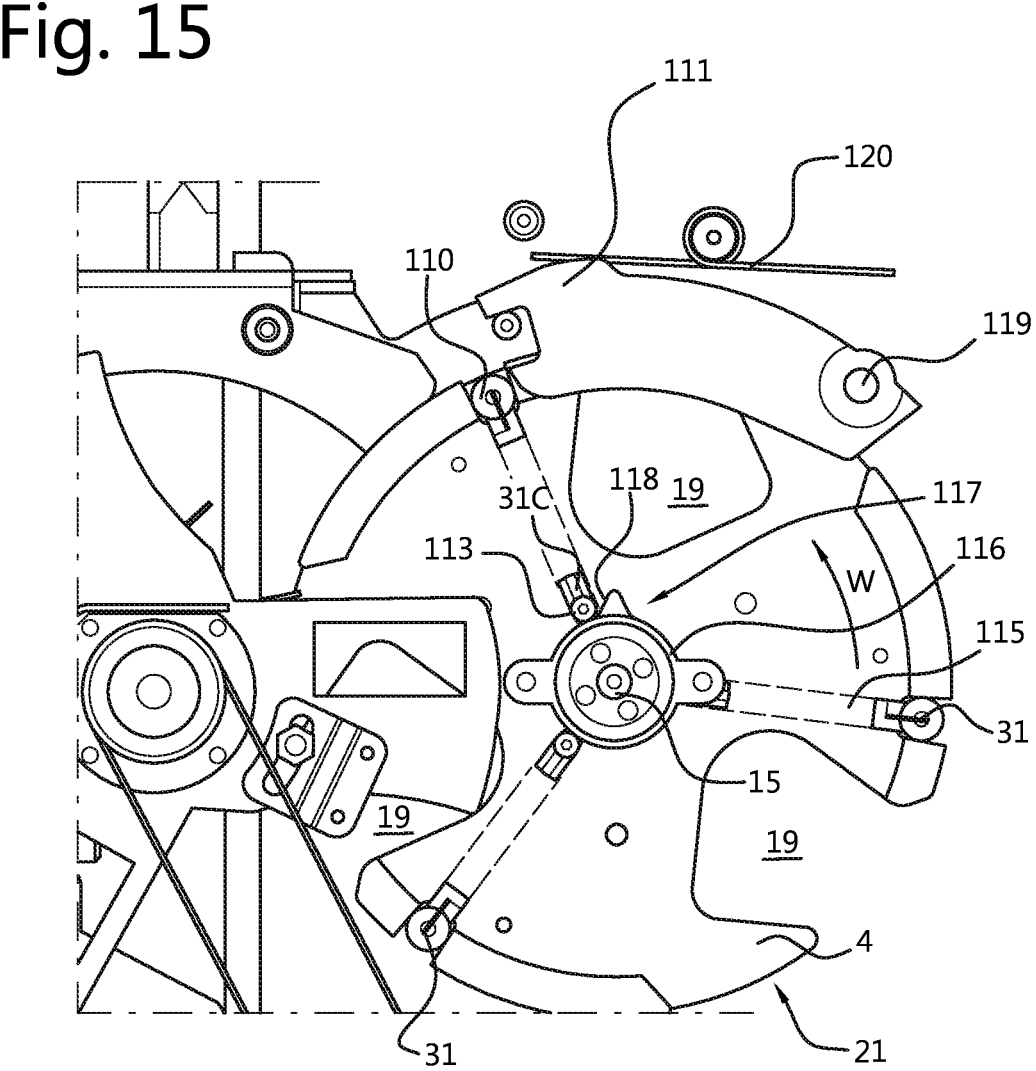
FIG. 15 shows schematically in side view part of an embodiment of an apparatus according to the disclosure.
Figure 16:
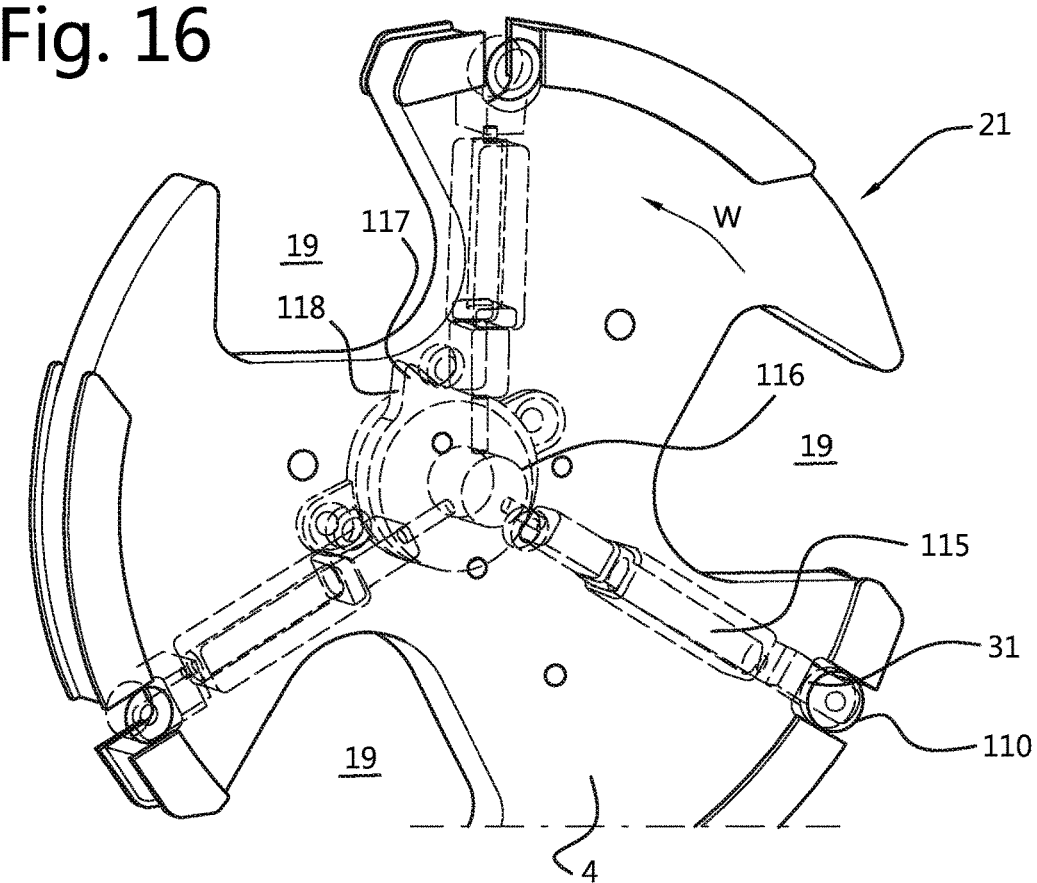
FIG. 16 shows a transparent view of part of a star wheel of an apparatus according to the disclosure.

FIG. 15 schematically shows in side view part of an embodiment of an apparatus 1 according to the disclosure. Especially a star wheel 4 rotating around a central axis 15. A series of first cells 19 is provided, evenly spaced around the periphery, for receiving parts of products or bundles of products to the taped. FIG. 16 shows a substantially transparent view of part of a star wheel 4 of an apparatus according to the disclosure, especially but not limited to FIG. 15.

Figure 17:
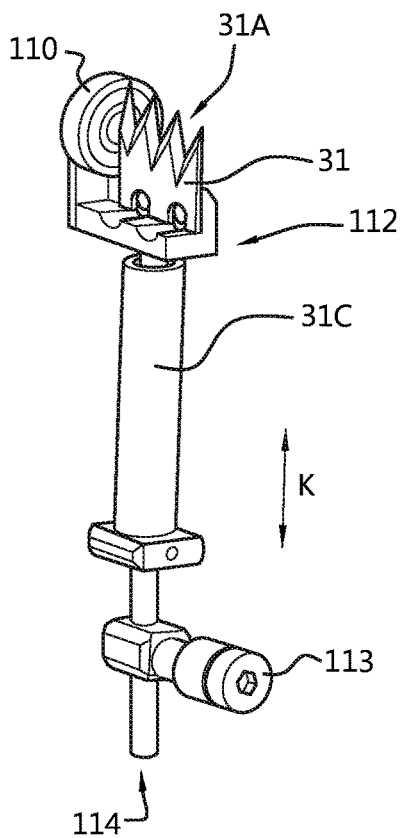
FIG. 17 shows schematically a knife with carrier and operating mechanism of an apparatus of the disclosure.

FIG. 17 schematically shows a knife 31 with carrier 31C and operating mechanism 101, for an apparatus 1 of the disclosure. In this embodiment the knife 31 has a serrated cutting edge 31A, which can be used for any knife 31 according to the disclosure. However the cutting edge 31A can have any suitable shape and configuration. In this embodiment the knife 31 is carried on a rod shaped carrier 31C, which at one end comprises a first guide element 110 near a first, outward facing end 112 of the carrier 31C, next to the knife 31, and a second guide element 113 at an opposite end 114. The star wheel 4 comprises a series of radial tunnels 115, through which a knife carrier 31C extends, such that the first end 112 extends close to the periphery 21, whereas the opposite end 114 extends close to the axis 15. A guide curve 116 in this embodiment is provided stationary, extending around the axis 15, provided with a cam 117, in FIG. 15 shown at a top of the curve 116, i.e. pointing upward. The second guide element 113, for example a wheel or bearing, is guided on the guide curve 116. When rotating the star wheel 4 in the appropriate direction W the second guide element 113 will be guided up along a flank 118 of the cam 117, thereby forcing the knife 31 from a first position into a second position, bringing the cutting edge 31A from within the periphery to a position outside the periphery, thereby cutting tape.

Along at least part of the periphery 21 of the star wheel 4 a guide 111 is provided, by which the first guide element 110 can be guided, for example as discussed before. The guide 111 may be stationary or it may be movable, for example pivotable around an axis 119 as shown in FIG. 15, for example biased in a direction towards the star wheel 4 by a spring 120. The guide 111 is provided such that after having cut tape the knife 31 is forced back into the first position by guiding the first guide element 110 along said guide 111, whereas the second guide element 113 is allowed to run off the cam 117 upon further rotation of the star wheel 4 in direction W. In embodiments in stead of or additional to a guide 111 other means can be provided for pushing and/or pulling the knife back to the first position, for example by providing a guide along the curve 116, by spring means biasing the knife carrier 31C towards the first position or by mechanical or electro mechanical means, such a motor, magnet or the like.

The invention is by no means limited to the embodiments shown and discussed here above. Many amendments and variations are possible within the scope of the invention. The star wheel can be driven differently, for example through a step motor engaging the axis 15 or by the feeding and/or discharging means. The knife carrier can be made differently, for example as an arm extending partly in the outlet opening 10, such that when the products are moved through the outlet opening the knife 31 is forced into a second cell 20, cutting loose the stems 90. In stead of the star wheel 4 in the present form, rotatable around an axis 15, a star wheel can be in the form of an endless star belt, formed as a belt having a series of cells in an outwardly facing surface, guided over at least two end wheels, such that a series of cells 19, 20 is fed along the guide surface, allowing a series of bundles to be handled at the same time. Means can be provided to print information on and/or in the tape and/or the foil strip, such as sealing date, expiration date of the product, packing apparatus identification, advertisements or other information. In the embodiments shown the width of the strip of tape 39 is about the same as the width of the tape 41. These widths can be different, for example the second tape 41 can have a greater width in order to provide further information, such as user information, warranties and other communications. The urging means can be designed differently, for example moving substantially linearly. A transport belt of conveyer could be provided on both sides of the star wheel, or on only one side, and could be provided with elements for urging the products into a cell of the star wheel. The pressing device could also be designed differently, for example a flexible element extending alongside one or both of the sides of the star wheel, at an upper side of the cells 19 when opening towards the inlet 9 and/or outlet 10, for holding the products at a lower side 67 of the cell 19. These and other modifications, including all combinations and permutations of aspects and parts of the embodiments shown are supposed to have been disclosed here, both in isolation and in combination.

What is claimed is:

1. An apparatus for sealing or tying products, comprising a housing with a first tape at least a first tape dispenser and a star wheel, a slot defined by or through the housing, wherein the star wheel extends at least partly in said slot, wherein the star wheel comprises at least a series of first cells, the first cells being intermittently disposed in the star wheel, each first cell being open to a periphery of the star wheel and two opposite sides thereof, wherein one of the star wheel and the housing is provided with at least one knife and the other of the star wheel and the housing is provided with at least one anvil, wherein the at least one knife is movable relative to the star wheel and/or wherein at least one of the at least one knife and the at least one anvil is movable relative to the star wheel and/or to the other of the knife and the anvil, wherein the apparatus is configured such that during cutting of the first tape from the tape dispenser, the first tape extends between the at least one knife and the at least one anvil, and wherein at least one edge portion is configured to urge at least one product to be tied into one of the first cells.

2. The apparatus according to claim 1, wherein the at least one edge portion is part of a protrusion or finger on or of a rotating element, rotatable such that said protrusion or finger can at least partly be rotated alongside the star wheel, past part of the cell into which the at least one product is urged.

3. The apparatus according to claim 1, wherein the at least one knife is provided in the star wheel, and the at least one anvil is provided in the housing, wherein at least the at least one knife is movable relative to the star wheel, in a substantially radial direction, such that a cutting edge of the knife is moved against said at least one anvil.

4. The apparatus according to claim 1, wherein multiple knifes are provided in the star wheel, spaced around the periphery of the star wheel, wherein each said knife is movable against a same anvil of the at least one anvil.

5. The apparatus according to claim 1, wherein each said knife is carried by a knife carrier which is configured for moving each said knife in a substantially radial direction of the star wheel, wherein one of each said knife or each said knife is pneumatically movable or wherein one of each said knife or each said knife is movable by at least a cam mounted on the star wheel or an axis of the star wheel.

6. The apparatus according to claim 1, wherein the at least one knife is movable in and relative to the star wheel, wherein a tape tautening means is provided for tautening the tape during said cutting with said at least one knife.

7. The apparatus according to claim 3, wherein each said knife can be brought in a first position in which a cutting edge of each said knife is brought in a position between the periphery of the star wheel and a centre of said star wheel and a second position in which said cutting edge is moved passed the periphery of said star wheel.

8. The apparatus according to claim 1, wherein seen in a direction of rotation of the star wheel a first knife is provided in the star wheel following a first cell, wherein a distance between the first cell and the first knife trailing said first cell, measured along the periphery of the star wheel is shorter than a distance between said first knife and a next first cell trailing said first knife.

9. The apparatus according to claim 1, further comprising a first number of edge portions or pairs of edge portions, distributed around a periphery of an axis or wheel, and the star wheel has a second number of first cells, wherein the first cells are present in a number that is at least one and is equal to n times the second number, wherein n is an integer.

10. The apparatus according to claim 1, further comprising at least one arm extending along part of a side of the star wheel or a pair of arms, extending along part of opposite sides of the star wheel, biased in a direction of an axis of the star wheel, the at least one arm or pair of arms being configured to press at least one product in the one of the first cells, away from a side of the one of the first cells open to the periphery by being brought into and out of engagement with the at least one product in the one of the first cells by movement of the edge portion and/or the star wheel.

11. The apparatus according to claim 1, wherein a sensor is provided near the edge portion, for controlling the edge portion based on movement of at least one first product of the at least one product through a sensing area of the sensor.

12. Apparatus for sealing or tying products, comprising a housing with a first tape, at least a first tape dispenser and a star wheel, a slot defined by or through the housing, wherein the star wheel extends at least partly in said slot, wherein the star wheel comprises at least a series of first cells, the first cells being intermittently disposed in the star wheel, each first cell being open to a periphery of the star wheel and two opposite sides thereof, wherein one of the star wheel and the housing is provided with at least one knife and the other of the star wheel and the housing is provided with at least one anvil, wherein the at least one knife is movable relative to the star wheel and/or wherein at least one of the at least one knife and the at least one anvil is movable relative to the star wheel and/or to the other of the knife and the anvil wherein the apparatus is configured such that during cutting of the first tape from the tape dispenser, the first tape extends between the at least one knife and the at least one anvil.

13. Apparatus for sealing or tying products, comprising a housing with a first tape, at least a first tape dispenser and a star wheel, a slot defined by or through the housing, wherein the star wheel extends at least partly in said slot, wherein the star wheel comprises at least a series of first cells, the first cells being intermittently disposed in the star wheel, each cell being open to a periphery of the star wheel and two opposite sides thereof, wherein one of the star wheel is provided with at least one knife and the housing is provided with at least one anvil, wherein the at least one knife is provided in the star wheel and is movable relative to the star wheel, and wherein the apparatus is configured such that during cutting of the first tape from the first tape dispenser, the first tape extends between the at least one knife and the at least one anvil.

* * * * *